United States Patent [19]

Ragnegård et al.

[11] Patent Number: 4,929,355
[45] Date of Patent: * May 29, 1990

[54] METHOD AND APPARATUS FOR THE SEPARATION OF CAUSTIC LIQUOR, LIME SLUDGE AND SLUDGE IN A CAUSTICIZING PROCESS

[75] Inventors: Samuel Ragnegård; Arne Sjöberg, both of Hedemora, Sweden

[73] Assignee: AB Hedemora Verkstäder, Hedemora, Sweden

[*] Notice: The portion of the term of this patent subsequent to Sep. 22, 2004 has been disclaimed.

[21] Appl. No.: 154,459

[22] Filed: Feb. 8, 1988

Related U.S. Application Data

[63] Continuation of Ser. No. 858,763, May 2, 1986, abandoned.

[30] Foreign Application Priority Data

Feb. 5, 1985 [SE] Sweden .............................. 85021236

[51] Int. Cl.$^5$ .......................................... B01D 33/08
[52] U.S. Cl. .................................. 210/784; 210/780; 210/791; 210/137; 210/331; 210/347; 210/402; 210/928; 162/29; 162/30.1; 162/30.11
[58] Field of Search ................... 210/403, 347, 360.1, 210/398, 416.1, 402, 161, 404, 137, 188, 340, 345, 331, 784, 780, 791, 928; 162/30.11, 30.1, 29, 55

[56] References Cited

U.S. PATENT DOCUMENTS 4,525,274 6/1985 Willus et al. ............... 162/30.11 X
4,695,381 9/1987 Ragnegard ..................... 210/404 X

FOREIGN PATENT DOCUMENTS 210864 2/1967 Sweden .
391545 2/1977 Sweden .
419997 9/1981 Sweden .
426959 2/1983 Sweden .

Primary Examiner—David L. Lacey
Assistant Examiner—Thi Dang
Attorney, Agent, or Firm—Pollock, Vande Sande & Priddy

[57] ABSTRACT

In a causticizing process for separating at least white liquor and lime sludge out of the process, filters in the form of discs or drums are arranged. The filtrations take place under positive pressure and the filters are arranged in a closed system. Such a pressure filter can also be arranged for the separation of sludge.

10 Claims, 4 Drawing Sheets

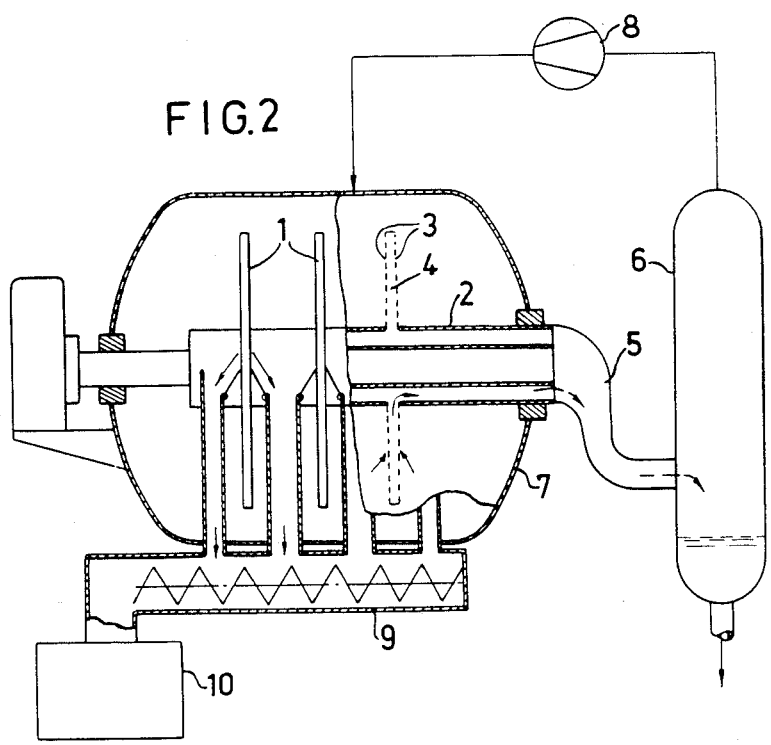
FIG.2
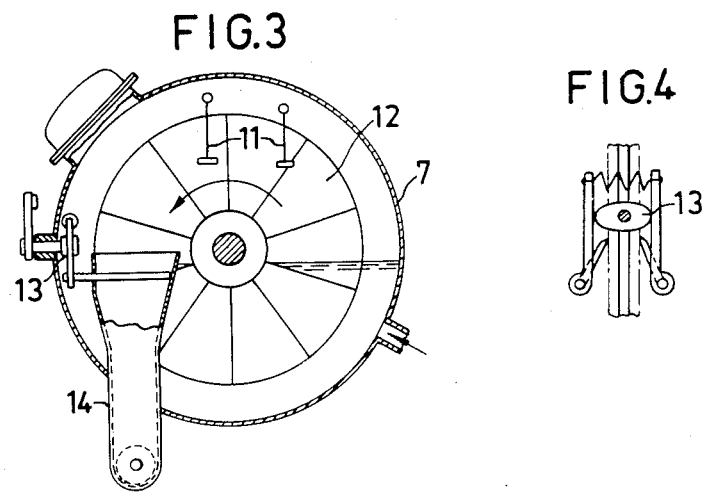
FIG.3
FIG.4

METHOD AND APPARATUS FOR THE SEPARATION OF CAUSTIC LIQUOR, LIME SLUDGE AND SLUDGE IN A CAUSTICIZING PROCESS

This application is a continuation of Ser. No. 858,763, filed on May 2, 1986, now abandoned.

FIELD OF THE INVENTION

The present invention relates to a causticizing process with separation of caustic liquor, lime sludge (mesa) and sludge out of the process, particularly the separation of caustic liquor and lime sludge.

BACKGROUND OF THE INVENTION

The green liquor in the causticizing process consists mainly of sodium carbonate. The green liquor in the process reacted with quick lime wherein the lime effectively reacts exothermically with a part of the water in the liquor and forms slack lime, calcium hydroxide. The slack lime reacts with the sodium carbonate in the green liquor and forms calcium carbonate, lime sludge, and sodium hydroxide, white liquor. The white liquor is separated out of the causticizing process and is reused in sulphate process for cooking paper wood chips, and the lime sludge is separated out of the process and is reused by burning to slack lime.

In a causticizing process according to known technique, the separation of white liquor and lime sludge takes place in tube filters, i.e. in the suspension immersed perforated tubes covered with filter cloth through which the white liquor is pressed. The dry content of the effluent lime sludge is about 30-35%. The lime sludge is washed in a subsequent wash step by dilution with water and subsequent thickening in a tube filter. The lime sludge dry content obtained herewith is also comparatively low, about 35%. Finally, the lime sludge suspension is filtered and the lime sludge is washed with constriction on a vacuum filter and a lime sludge dry content of about 70% is obtained.

Tube filters for separating lime sludge and white liquor accordingly yield a relatively low lime sludge dry content, about 30-35%. This means a low efficiency and a load on subsequent lime sludge wash. Moreover, tube filters are usually not operating continuously. The filtering operation must be interrupted with about 4 minute intervals for removing the filter cake on the filter cloth and cleaning the filter cloth by backwashing. Such a method means a complication in a process which otherwise is continuous.

According to known technique vacuum filters also are used in causticizing processes. Vacuum filters are, however, burdened with disadvantages. They must operate with high vacuum in order to yield a good wash effect and high outgoing mass dry content. Required vacuum sets limits to the temperature of the suspension to be filtered and which seldom may exceed 70° C. In causticizing processes known equipment for the separation of lime sludge and a white liquor and for the removal of white liquor out of the process, i.e. tube filters and vacuum filters, are accordingly badly adapted for effective filtering under pressure and at high temperature. Neither can washing of the lime sludge in tube filters be effectively accomplished; and the vacuum filters can only be used with a limited difference pressure and cause large heat losses.

For separating sludge from green liquor in present causticizing processes, green liquor clarifiers are used. A green liquor clarifier requires huge space and large investment costs as well as huge costs in connection with emptying the clarifier for internal maintenance thereof. Moreover, sludge with low dry content is obtained.

SUMMARY OF THE INVENTION

The above-mentioned disadvantages have been eliminated substantially by the present invention by using as filters in the causticizing process, for at least the white liquor and the lime sludge separation and preferably also the sludge separation, rotating disc or drum filters which operate during positive pressure (20 kPa and more, preferably between 50 and 100 kPa) and which are arranged in a closed system. The following advantages, compared with known technique, from the use of disc or drum filters in accordance with the invention are obtained:

continuous operation,
high dry content,
large filter surface and high efficiency,
less degree of oxidation and thereby decrease of crustation formations,
effective wash of the lime sludge also at high temperatures,
unlimited high pressure,
warmer white liquor and lime sludge,
decrease of circulating liquor amounts,
comparatively small space and good economy.

According to the invention the causticizing process is characterized in that, at least for the white liquor and lime sludge separation, a filter operating continuously under positive pressure and consisting of at least one filter element rotatably arranged in a pressure vessel and running for each revolution through a filtering cycle consisting of filtering zones in liquid phase and gaseous phase is arranged in a closed system.

DESCRIPTION OF THE DRAWINGS

The invention is described in the following schematically shown embodiments with reference to the accompanying drawings, wherein FIG. 2 is a side view, partly cut off, showing one embodiment of a filter arranged in a causticizing process according to the invention, FIG. 3 is an end view of the filter shown in FIG. 2, FIG. 4 is a view illustrating a removing device in the filter according to FIGS. 1 and 2.

DETAILED DESCRIPTION OF THE INVENTION

Figure 1:
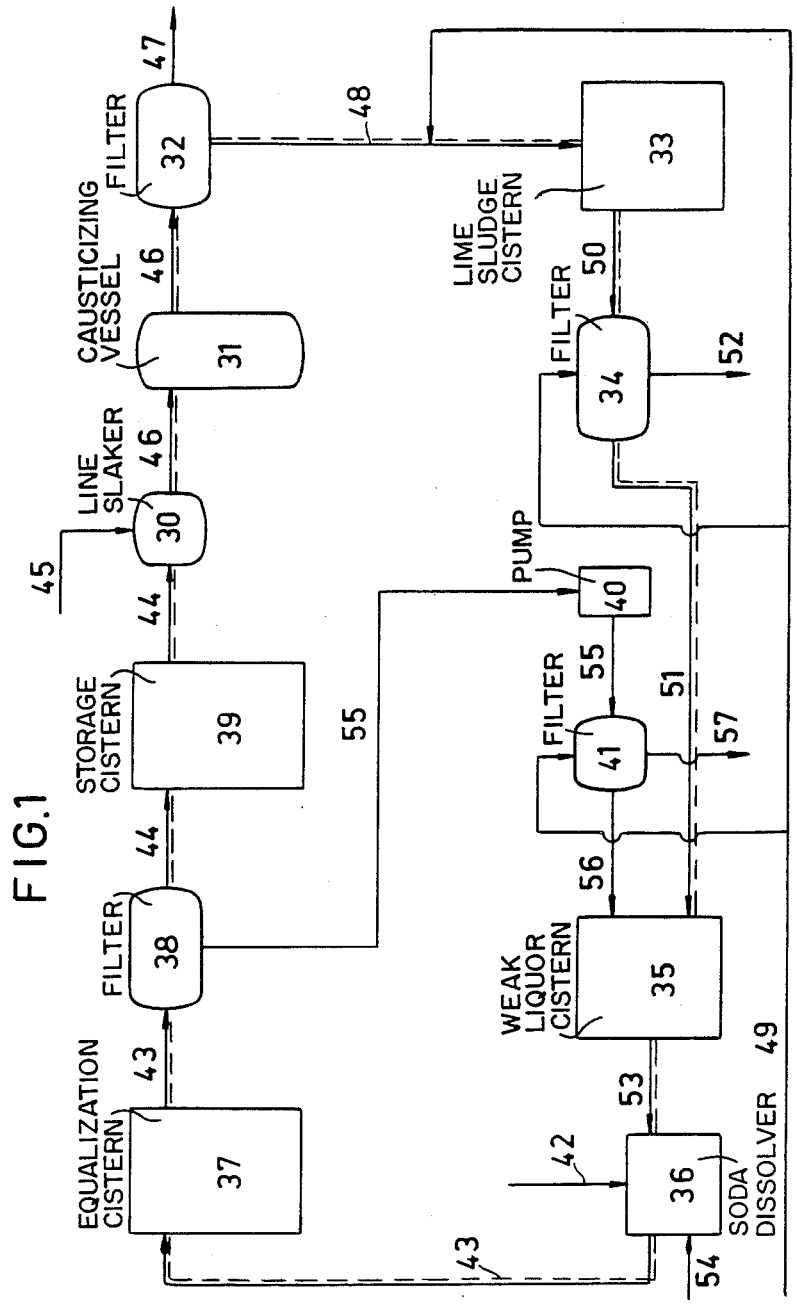
FIG. 1 illustrates an embodiment of a causticizing process.

FIG. 1 illustrates schematically a causticizing process with filters for separating white liquor, lime sludge (mesa) and sludge out of the process. In lime-slaker 30 clarified green liquor 44 reacts with quick lime 45 and forms a mixture 46 of lime sludge (calcium carbonate)

and white liquor (sodium hydroxide). The reaction is completed in the causticizing vessel 31 and the mixture is thereafter conducted to filter 32, where clear white liquor 47 is separated from lime sludge 48 and a part of remaining white liquor. This lime sludge is mixed with hot water 49 and homogenized further in lime sludge cistern 33. The mixture 50 is supplied to filter 34, where the lime sludge is washed with hot water 49, dewatered and separated (arrow 52), while the filtrate in the form of weak liquor 51 is conducted to weak liquor cistern 35 and thereafter to soda dissolver 36, in which charge 42 from soda pan is mixed with the weak liquor 53 and an additive of water 54 to a green liquor 43 of appropriate power. The turbid green liquor 43 containing a finely divided black sludge is via equalization cistern 37 conducted to a filter 38, where separation between sludge 55 and clear green liquor 44 takes place. The clear green liquor 44 is via a storage cistern 39 conducted to the lime slaker 30, while the sludge 55 with a part of remaining green liquor is via pump system 40 conducted to a filter 41. The sludge is washed with hot water 49 and filter cake in the form of dewatered sludge is formed by the filtration and is discharged out of the process (arrow 57), while the filtrate 56 consisting of wash water and green liquor is conducted to the weak liquor system 35 for further re-circulation.

According to the invention, previously known filters, i.e. tube filters and vacuum filters, for obtaining the above-mentioned advantages, pressure filters operating in a closed system are arranged in the causticizing process, at least in some of the filters and particularly the filters 32 and 34. Embodiments of such filters are shown in FIGS. 2 to 7.

FIGS. 2 and 3 show a filter consisting of discs 1 rotatably arranged in a pressure vessel 7 and mounted radially on a shaft 2. Each disc usually consists of two decks 3 of perforated plates covered with a filter cloth. Filtrate channels 4 are formed between the decks for discharging the filtrate to channels in the shaft 2. The channels lead to one end of the shaft and end in a discharge pipe 5 and filtrate separator 6. As shown in FIG. 3, the filter discs 1 are composed of a number of disc sectors 12, which for instance can be shaped as shown in U.S. Pat. application No. 577,913, now abandoned. The discs are about 50% immersed in the lime sludge suspension, which is pumped into the pressure vessel 7 under positive pressure. The pressure vessel 7 surrounding the whole filter makes positive pressure possible. The gas, which follows with the liquid to the filtrate separator 6 and is separated therein, is conducted back to the pressure vessel 7 via a compressor 8, for instance a blower. Thus, the filter is arranged in a closed system.

When discs 1 rotate down into the trough, the suspension is pressed against the filter cloth. The lime sludge fastens as a layer on the cloth and the white liquor is conducted via the channels 4 out of the filter. When the lime sludge upon the rotation of the discs leaves the liquid level the white liquor in the lime sludge on the cloth continues to be pressed inwards towards the cloth whereby the dry content of the lime sludge is essentially increased. The lime sludge can thereafter by some appropriate removal device be removed from the discs and be discharged from the filter via a discharge device 9 and gate 10 for further transport in accordance with FIG. 1. A so called precoat-filtering can appropriately be used, i.e. a filtering through both the lime sludge on the filter cloth and through the filter cloth itself, and in this case so called conditioning scrapers which, besides scraping off the lime sludge fastened on the pre-coating can also scrape off a piece of the precoating for each revolution, can appropriately be used. Such scrapers are shown in FIG. 4 and are, as exemplified, operated by excenters 13. Alternatively or in combination, the lime sludge can also be washed off the filter cloth by appropriate spray devices 11. In FIG. 3 there is also shown a gutter 14 in which removed lime sludge falls down into the discharge device 9.

Figure 5:
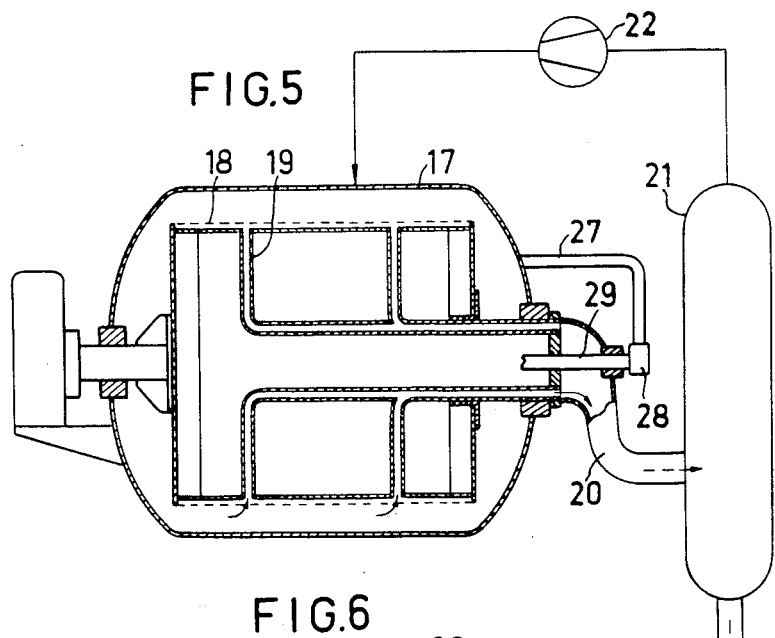
FIG. 5 is a view corresponding to FIG. 2 and showing another embodiment of a filter arranged in the causticizing process according to the invention.
Figure 6:
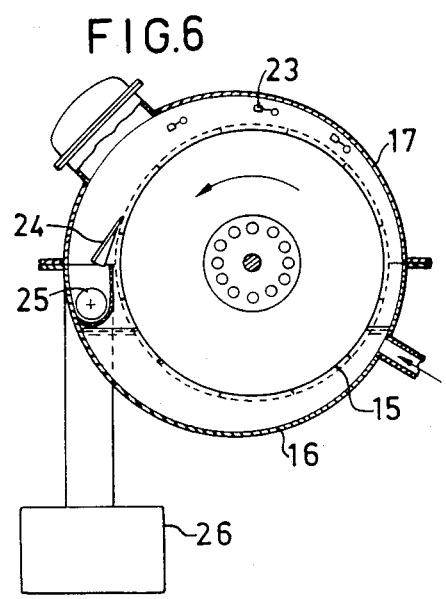
FIG. 6 is an end view of the filter according to FIG. 5.

According to FIGS. 2 and 3, instead of a disc filter operating under pressure, a drum filter operating under positive pressure and likewise arranged in a closed system can be used. Such a drum filter is shown in FIGS. 5 and 6. A drum 15 is partly immersed into the suspension contained in trough 16. Upon rotation, according to the arrow, the lime sludge fastens on the filter cloth around the periphery of the drum and the filtrate is pressed into the interior of the drum for discharge. The trough 16 together with the cape 17 form a pressure vessel and makes a positive pressure during the filtering possible. When the lime sludge comes up out of the suspension, it is dried by the fact that the filtrate is pressed into the drum via the filter cloth and the perforated outer mantle 18. The filtrate is conducted out of the filter via the filtrate channels 19, the discharge pipe 20 and the filtrate separator 21. The gas following with the filtrate to the filtrate separator 21 is fed back to the filter via compressor 22 for maintaining the positive pressure in the filter. Thus, the filter operates in a closed system. In connection with the drying of the lime sludge on the drum, the lime sludge can be washed with hot water from spray devices 23 before it is removed, for instance with a scraper device in the form of a scraper 24. The removed lime sludge is discharged from the filter via discharge device 25 and gate 26. The filter can also be provided with a pressure balancing device consisting of a tube 27 from the cape 17 leading to a rotating coupling 28 and a tube 29 leading into the drum.

Figure 7:
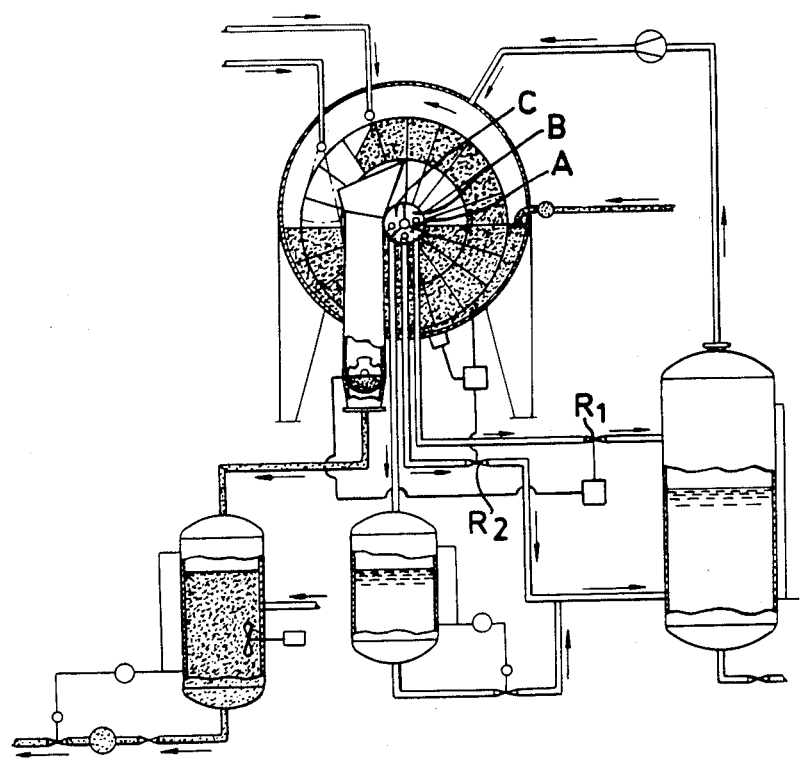
FIG. 7 is an end view illustrating a further embodiment of a filter in the causticizing process of the invention.

In this connection another disc filter operating advantageously under positive pressure and arranged in a closed system is shown in FIG. 7. Such a disc filter and variants thereof are described and shown in a copending patent application Ser. No. 858,769 now U.S. Pat. No. 4,695,381, filed simultaneously with this application. A more detailed description of these filters is given in said application. The features particularly characterizing these filters are that the filter elements for each revolution run through a filtering cycle consisting of filtering zones in liquid phase and gaseous phase, each with separate filtrate outlets, wherein means are provided for controlling the difference pressure over the filter elements in each filtering zone independent of each other. Three filtering zones A, B and C and governed control valves $R_1$ and $R_2$ in the filtrate outlets are shown in FIG. 7.

Although not shown, the filters can suitably be formed or provided with means for guaranteeing adequate continuous filtering in the closed pressure filters independent of suspension concentration or dirt content in the gas media. Such means can for instance be provided in order to prevent clogging of lime sludge in the discharge device, particularly the gutter, which could jeopardize the operation. Such a means can be an inner lining or a double mantel for cooling of the inner mantel and forming condense on the interior surface of the inner mantel. Moreover, the pressure medium, for instance vapor, which is re-circulated via the compressor and contains gases deriving from other substances included in the suspension, can cause problems with incrusts in pipes and compressor. Material choice, chemical or mechanical cleaning or a combination of said measures but also a particularly configuration of the compressor are examples on solution of the incrusting problem. A certain sedimentation in the suspension can exist in the filters, but also for this possibly existing problem there are now developed improved solutions.

By using, according to the invention pressure filters arranged in a closed system in a causticizing process instead of previously used filters or apparatus the following essential advantages are achieved.

By carrying out the causticizing process under a positive pressure and thereby making use of the reaction heat, this positive pressure, according to the invention, is maintained at the out-filtering of the lime sludge; and such is appropriate also at the washing of the lime sludge and the subsequent filtering. Thus, the pressure is relieved first in connection with the removal of the lime sludge from the last filter. The obtained lime sludge reaches by this method a higher dry content and a higher temperature than by conventional technique, which is an essential advantage at the subsequent lime sludge burning in the lime sludge oven. Also the separated white liquor, which shall be used in the digesting of the pulp wood chips, has a higher temperature and a higher concentration than in conventional technique. For instance, a pressure disc filter such as filter 32 is so effective that it, without deterioration of the wash result, replaces both the tube filters used for white liquor separation and for the first lime sludge washing in a conventional causticizing process.

According to the invention, by operating a filter under positive pressure and continuously, the following essentially improved values, compared with for instance a conventional tube filter, this is besides the fact that tube filters do not operate continuously (the filtering process must be interrupted with equal intervals). When using for instance a pressure disc filter as filter 32 in the process, a dry content of the lime sludge of about 75% is obtained, while the dry content from a tube filter is only about 30 to 35%. The amount white liquor that follows with the lime sludge 48 from the pressure disc filter is decreased with about 75% compared with a tube filter. Moreover, the amount hot water 49 for the washing of the lime sludge and weak liquor 53 to the soda dissolver 36 is decreased with about 50%. Also the amount liquor 43, 44, 46 from the soda dissolver 36 to the filter 32 is decreased to about 85 per cent. Apparatus and conduits can furthermore be diminished proportionally to the liquor amounts without restriction in function, which is a great economic advantage.

Comparatively, it can furthermore be mentioned that, in for instance a vacuum filter for the washing of the lime sludge such as 34 in FIG. 1, a disadvanteguous air admixture in the weak liquor from the filter is obtained resulting in a large portion of the sodium sulphite in the weak liquor being oxidized to sulphate, theo-sulphate and sulphite. The reduction degree of the sulphur in the weak liquor from the filter to the soda dissolver 36 becomes low and thus lowers the reduction degree of the green liquor 43, which negatively influences the causticizing degree of the white liquor 47 to the digester. On the contrary, in accordance with the invention, by decreasing to about 25% the amount alcali in the lime sludge 48 from a pressure filter and by using a closed pressure filter 34, the amount of oxidized sulphur in the weak liquor 53 decreases considerably and the influence of the weak liquor on the reduction degree of the green liquor 43 becomes minimum.

Concerning the separation of sludge from green liquor, by filter 38 in FIG. 1, according to known technique a green liquor clarifier and a subsequent stage vacuum filter (filter 41 are usually used in FIG. 1). The green liquor clarifier requires large space and means great investment costs. It accumulates large amounts of liquor, about 1000 to 2000 m$^3$, which is difficult to handle in connection with emptying for internal maintenance of the clarifier and which means a great cost in form of tight capital. From the clarifier un-washed sludge having low dry content, about 10 per cent, is obtained. By using a filter operating under positive pressure and in a closed system in accordance with the present invention, the following advantages compared with a green liquor clarifier, are achieved:

requires less space,
less investment costs,
accumulates no appreciable liquor volume,
less oxidizing of the liquor,
results in hotter green liquor and sludge,
results in high outgoing dry content, about 40%,
results in a decrease of the amount of green liquor recirculated with the sludge (to about 20%),
makes sludge washing possible (41 in FIG. 1).

According to the present invention compared with a vacuum filter when using a filter in closed system and operating such under positive pressure, the following advantages are obtained no oxidation of the weak liquor,
less temperature losses,
unlimited difference pressure,
less outer dimensions,
no fall height is required as is the case when using vacuum filter.

We claim:

1. Apparatus for operating in a continuous causticizing process for separating either white liquor from lime sludge or green liquor from sludge under positive pressure, said apparatus comprising:

a pressure vessel;
rotatable filter element means arranged in the pressure vessel so as to pass for each revolution through a filtering cycle having filtering zones in a liquid phase and a gaseous phase;
means for removing filter cake formed on said filter element means during filtering;
means for discharging removed filter cake from the pressure vessel;
a common outlet means for discharging a mixture of filtrate and gaseous medium from the pressure vessel;
means outside of the pressure vessel and connected to said means for discharging the mixture of filtrate and gaseous medium for separating the filtrate and the gaseous medium from each other;
first outlet means for discharging the filtrate from said separating means;
second outlet means for discharging the gaseous medium from said separating means;
conduit means connecting said gaseous medium outlet means to the interior space of the pressure vessel between the inner surface of the pressure vessel and the outer surface of said filter element means; and
means arranged between said separating means and the pressure vessel and connected to said conduit means for increasing the pressure of the gaseous medium before conducting the gaseous medium back to the pressure vessel through said conduit means.

2. Apparatus according to claim 1, wherein said filter element means comprises a disc filter having disc elements arranged in parallel mounted on a shaft at a distance from each other.

3. Apparatus according to claim 2, wherein each filtering zone is provided with at least one common outlet for discharging the mixture of filtrate and gaseous medium;

and further comprising:

means for controlling, independent of each other, the pressure difference over the filter element means in each of the filtering zones.

4. Apparatus according to claim 1, wherein said filter element means comprises a drum filter.

5. Apparatus according to claim 4, further comprising means for equalizing the pressure between the outside and the inside of the filter drum.

6. Apparatus according to claim 1, further comprising means for preventing blocking of the filter cake in said discharge means for the removed filter cake.

7. A method of effecting separation of liquor and lime sludge out of a continuously operating causticizing process, wherein the method includes separating white liquor from lime sludge as well as green liquor from sludge under positive pressure in a separate pressure vessel for each of the separations by obtaining a filtrate through a filter system having a pressure vessel and at least one filter element means covered by a filter cloth and arranged in the pressure vessel, the green liquor separation taking place prior to the white liquor separation in the process, the method comprising the steps of:

feeding a sludge and liquor suspension to said pressure vessel;

rotating said filter element means for each revolution through a filtering cycle consisting of filtering zones in a liquid phase and a gaseous phase;

operating the separation in said pressure vessel with positive pressure being applied over the filter cloth;

removing filter cake formed on said filter cloth during filtering;

discharging the removed filter cake from the pressure vessel;

discharging a mixture of filtrate and gaseous medium from the pressure vessel through a common outlet;

separating the discharged filtrate from the discharged gaseous medium;

discharging the separated filtrate;

discharging the separated gaseous medium to a conduit means connected to the interior space of the pressure vessel between the inner surface of the filter vessel and the outer surface of the filter cloth; and increasing the pressure of the separated gaseous medium before conducting the separated gaseous medium back to the pressure vessel through said conduit means.

8. A method according to claim 7, further comprising the step of:

controlling, independent of each other, the pressure difference over the filter element means in each filtering zone.

9. A method of effecting separation of white liquor and lime sludge out of a continuously operating causticizing process, wherein the method includes separating the white liquor from lime sludge under positive pressure in a pressure vessel by obtaining a filtrate through a filter system having a pressure vessel and at least one filter element means covered by a filter cloth and arranged in the pressure vessel, the method comprising the steps of:

feeding a sludge and liquor suspension to said pressure vessel;

rotating said filter element means for each revolution through a filtering cycle consisting of filtering zones in a liquid phase and a gaseous phase;

operating the separation in said pressure vessel with positive pressure being applied over the filter cloth;

removing filter cake formed on said filter cloth during filtering;

discharging the removed filter cake from the pressure vessel;

discharging a mixture of filtrate and gaseous medium from the pressure vessel through a common outlet;

separating the discharged filtrate from the discharged gaseous medium;

discharging the separated filtrate;

discharging the separated gaseous medium to a conduit means connected to the interior space of the pressure vessel between the inner surface of the filter vessel and the outer surface of the filter cloth; and increasing the pressure of the separated gaseous medium before conducting the separated gaseous medium back to the pressure vessel through said conduit means.

10. A method of effecting separation of green liquor from sludge out of a continuously operating causticizing process, wherein the method includes separating the green liquor and sludge under positive pressure in a pressure vessel by obtaining a filtrate through a filter system having a pressure vessel and at least one filter element means covered by a filter cloth and arranged in the pressure vessel, the method comprising the steps of:

feeding a sludge and liquor suspension to said pressure vessel;

rotating said filter element for each revolution through a filtering cycle consisting of filtering zones in a liquid phase and a gaseous phase;

operating the separation in said pressure vessel with positive pressure being applied over the filter cloth;

removing filter cake formed on said filter cloth during filtering;

discharging the removed filter cake from the pressure vessel;

discharging a mixture of filtrate and gaseous medium from the pressure vessel through a common outlet;

separating the discharged filtrate from the discharged gaseous medium;

discharging the separated filtrate;

discharging the separated gaseous medium to a conduit means connected to the interior space of the pressure vessel between the inner surface of the filter vessel and the outer surface of the filter cloth; and increasing the pressure of the separated gaseous medium before conducting the separated gaseous medium back to the pressure vessel through said conduit means.

* * * * *